Nov. 11, 1958  R. S. BRIMHALL  2,859,978
SHOCK ASSEMBLY FOR VEHICLE SUSPENSIONS
Filed July 21, 1955  5 Sheets-Sheet 1
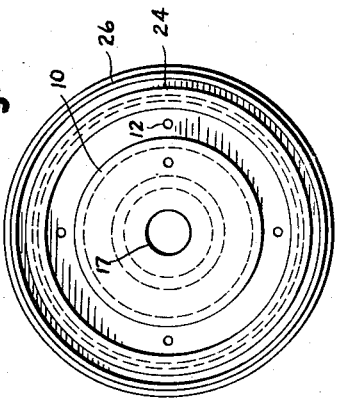
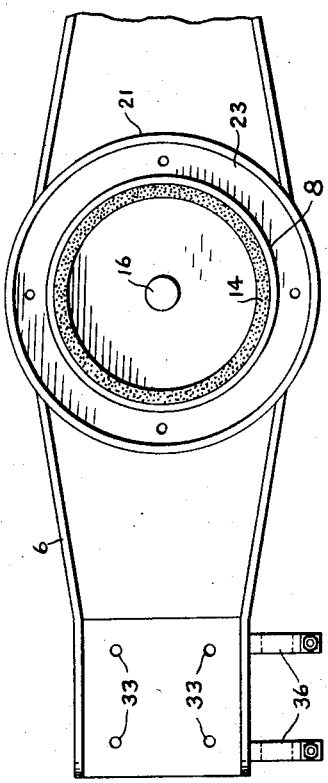
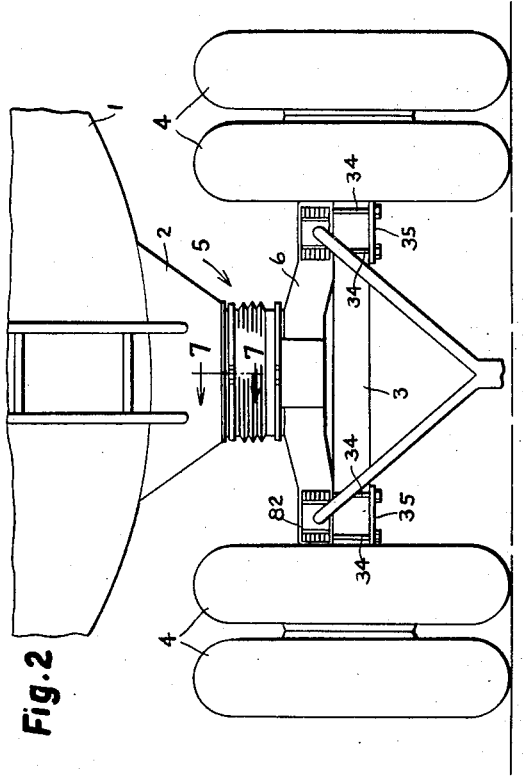
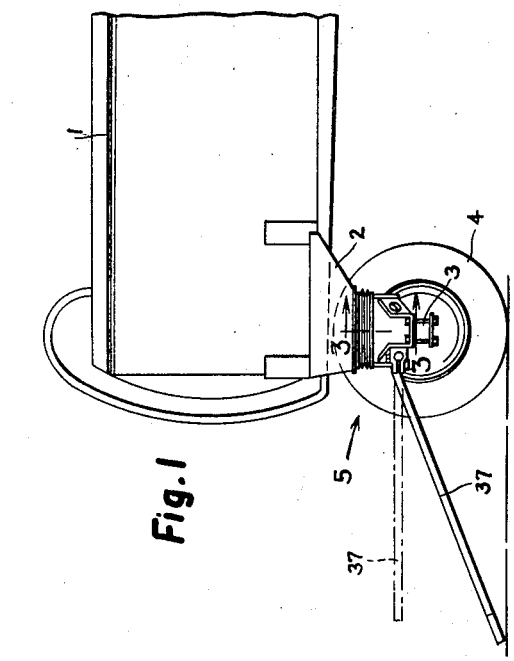
INVENTOR:
RAY S. BRIMHALL
By Andrus & Scales
Attorneys Nov. 11, 1958 R. S. BRIMHALL 2,859,978
SHOCK ASSEMBLY FOR VEHICLE SUSPENSIONS
Filed July 21, 1955 5 Sheets-Sheet 2
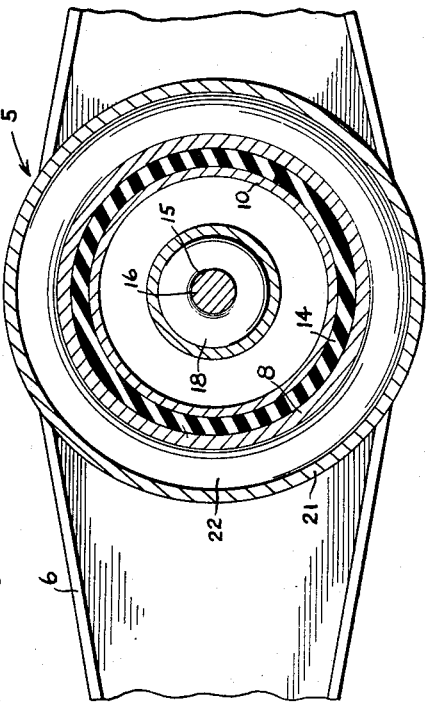
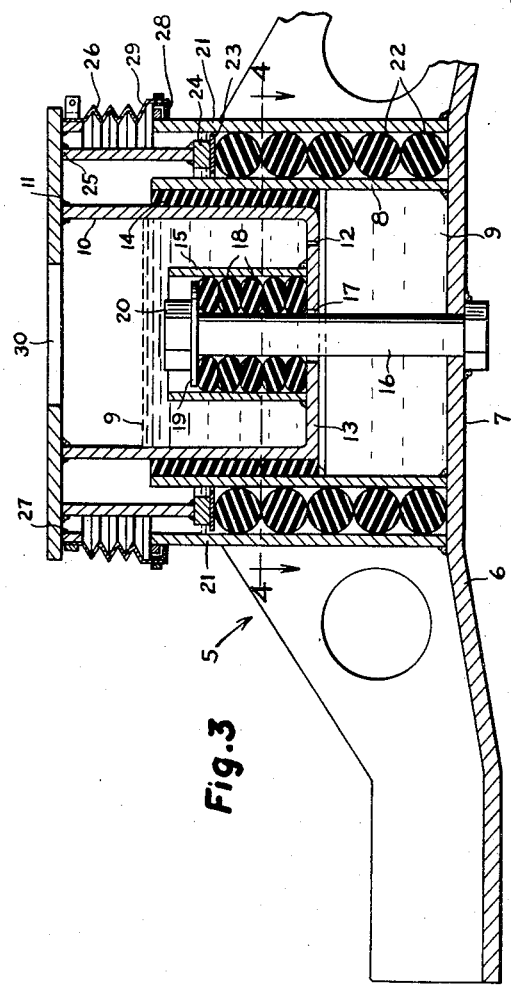
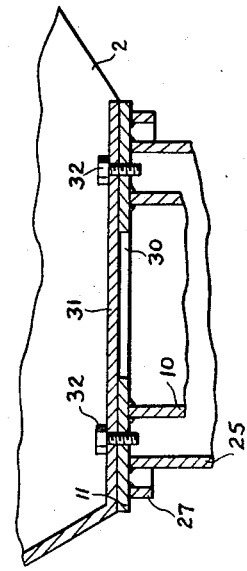
INVENTOR:
RAY S. BRIMHALL
BY Andrus & Seeales
Attorneys

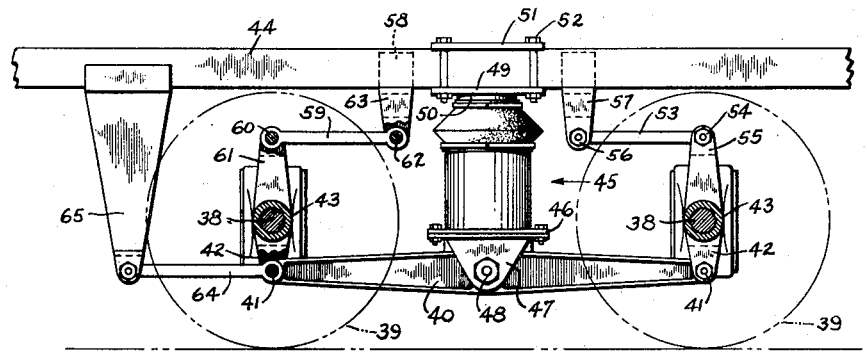
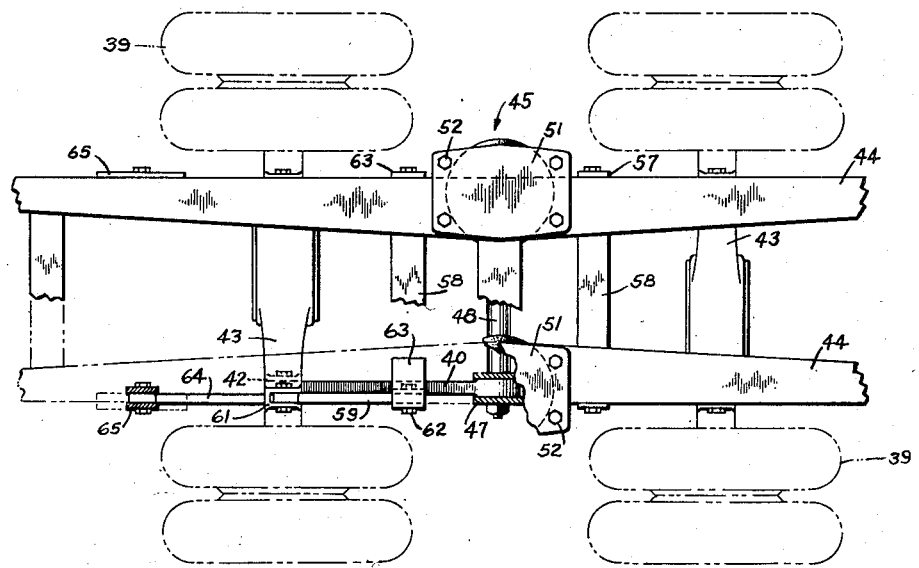

Nov. 11, 1958 R. S. BRIMHALL 2,859,978
SHOCK ASSEMBLY FOR VEHICLE SUSPENSIONS
Filed July 21, 1955 5 Sheets-Sheet 4
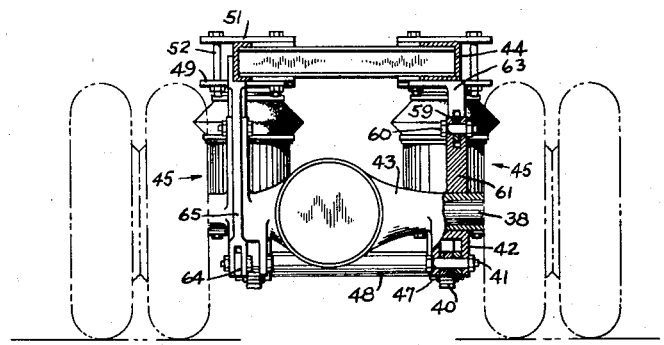
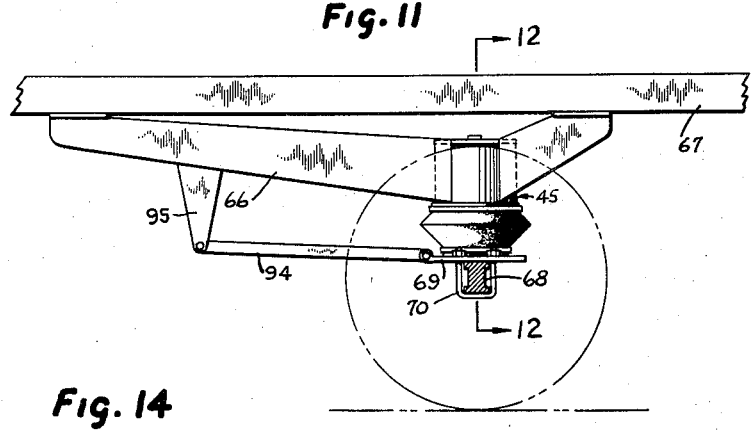
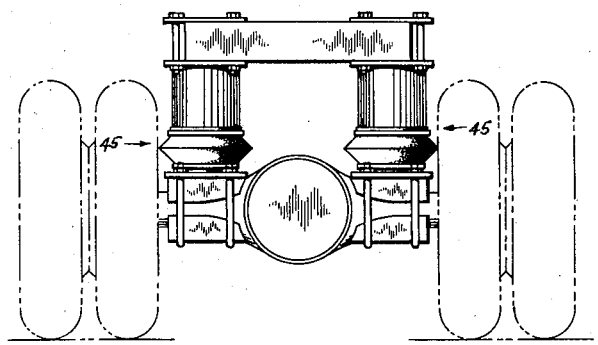
INVENTOR.
RAY S. BRIMHALL
BY
Andrus & Scales
Attorneys Nov. 11, 1958   R. S. BRIMHALL   2,859,978
SHOCK ASSEMBLY FOR VEHICLE SUSPENSIONS
Filed July 21, 1955   5 Sheets-Sheet 5
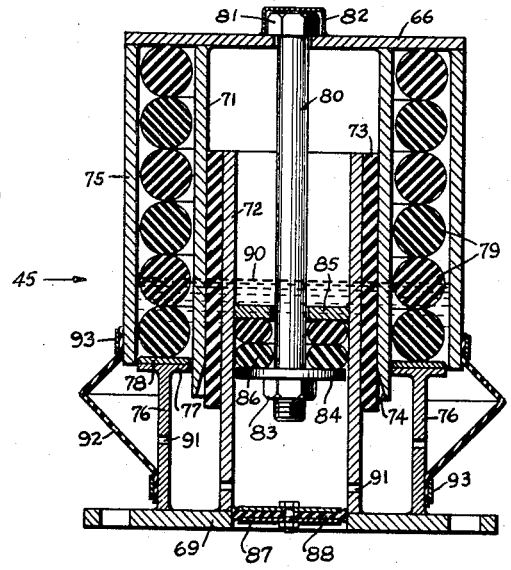
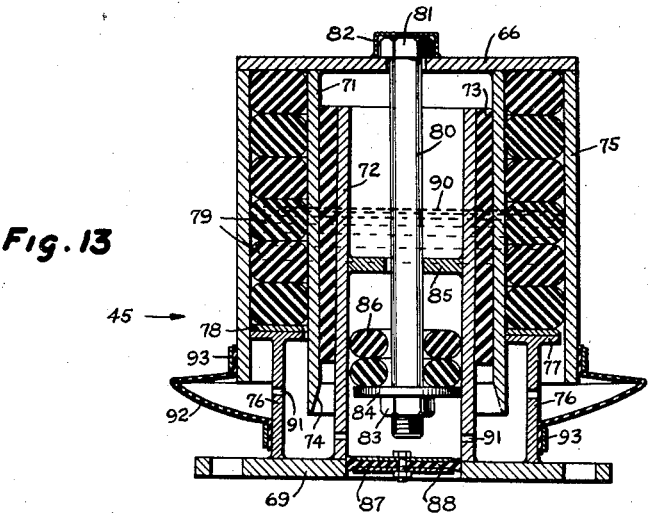
INVENTOR.
RAY S. BRIMHALL
BY
*Andrus & Sceales*
Attorneys United States Patent Office 2,859,978
Patented Nov. 11, 1958

2,859,978
SHOCK ASSEMBLY FOR VEHICLE SUSPENSIONS
Ray S. Brimhall, Salt Lake City, Utah
Application July 21, 1955, Serial No. 523,566
4 Claims. (Cl. 280—136)

This invention relates to a vehicle shock assembly and has reference to front-end fifth wheel and suspension assemblies for employment on trucks, trailers and other vehicles. This application is a continuation-in-part of application, Serial No. 445,116, filed July 22, 1954, by the same inventor, now abandoned.

One object of this invention is to provide a shock assembly for turnable axles of trailers, the shock assembly being so constructed whereby it has sufficient strength and at the same time has good turning qualities and is an excellent shock assembly.

Another object of this invention is to provide an improved shock assembly of such a nature whereby it may be easily and quickly attached to conventional type trailers having turnable front axles.

A further object of this invention is to provide an improved shock assembly which is of such a construction whereby it has all of the desired strength and shock qualities and at the same time is relatively light in weight as compared with conventional types of shock assemblies.

A still further object of this invention is to provide an improved shock assembly whose manufacture is of such a nature whereby the manufacturing cost thereof is greatly reduced as compared with conventional shock assemblies for the same type of trailer.

Another object is to provide a shock assembly of generally lightweight which can be employed as a front end fifth wheel or as a rear suspension assembly on trucks and trailers and the like.

In general the shock assembly of the invention comprises two generally cylindrical members, one of which is received inside the other and referred to in the description as a piston. One of the cylindrical members is secured to a mounting member attached in turn to the axle of the vehicle to which the assembly is to be applied while the other cylindrical member is secured to a mounting member attached to the frame of the vehicle body. Relative vertical movement between the cylindrical members due to road shock in service is cushioned in one vertical direction by resilient shock absorbing means disposed between the outer cylinder and a sleeve member. The rebound shock in the opposite vertical direction is absorbed by resilient shock absorbing means disposed inside the inner cylinder or cylindrical member around a fastening means securing the cylinders together but permitting a predetermined vertical movement between them.

The cylindrical members are adapted to turn relative to each other when the shock assembly is employed as a fifth wheel or they can be fixed relative to each other when the shock assembly is used as a rear suspension unit for either dual axle or single axle vehicles. In either event an elongated resilient bearing member is located between the two cylinder members and is secured to one of them to absorb lateral shocks as the vehicle is moved over uneven terrain and the cylinder members are offset laterally relative to each other. The term "lateral" includes angular and rotational as well as horizontal shocks.

The accompanying drawings illustrate the best mode presently contemplated by the inventor for carrying out the invention.

In the drawings:

Figure 1 is a side elevational view of the front portion of a conventional trailer having a steerable front axle and shows the same provided with the shock assembly of the invention employed as a fifth wheel, the front axle being shown in section and one of the wheels thereof being omitted, a towing position of a draft member being shown in dotted lines;

Fig. 2 is an enlarged fragmentary front elevational view of the trailer of Figure 1 and shows more clearly the details of the shock assembly and the relationship thereof with respect to the body and front axle of the trailer;

Fig. 3 is an enlarged fragmentary vertical sectional view taken substantially upon the plane indicated by the section line 3—3 of Figure 1 and shows the specific details of the internal construction of the shock assembly;

Fig. 4 is an enlarged fragmentary transverse horizontal sectional view taken substantially upon the plane indicated by the section line 4—4 of Figure 3 and shows the relationship of the various parts of the shock assembly;

Fig. 5 is an enlarged fragmentary top plan view of the bottom half of the shock assembly and shows the relationship thereof with respect to a supporting frame member;

Fig. 6 is an enlarged bottom plan view of the upper half of the shock assembly;

Fig. 7 is an enlarged fragmentary vertical sectional view taken substantially upon the plane indicated by the section line 7—7 of Fig. 2 and shows the manner in which the top half of the shock assembly is removably secured to the trailer body.

Fig. 8 is a side elevational view with parts broken away and sectioned and showing the shock assembly employed as a suspension unit with a dual or tandem axle assembly such as might be used on the rear of a truck;

Fig. 9 is a top plan view of the shock assembly of Fig. 8;

Fig. 10 is a rear elevational view of the shock assembly of Fig. 8;

Fig. 11 is a side elevational view showing the shock assembly secured to a single rear axle of a vehicle and used as a suspension assembly to suspend the axle from the vehicle;

Fig. 12 is an enlarged sectional view with parts in elevation taken on line 12—12 of Fig. 11 and with the rebound shock being taken by the inner resilient members;

Fig. 13 is a view similar to Fig. 12 but with the vertical load taken by the outer resilient members and with the inner cylinder or piston being shown in an exaggerated manner as laterally displaced relative to the outer cylinder to illustrate the displacement of the bearing member between the cylinders when one wheel of the vehicle is displaced vertically to the opposite wheel of the vehicle; and Fig. 14 is a rear view of a vehicle with a single axle and illustrating the employment of the shock assembly on each side of the axle as a means of suspending the axle from the vehicle.

Referring now to the drawings in detail, it will be seen that there is illustrated in Figs. 1 and 2 a conventional tank trailer which includes an elongated tank body 1. Secured to the forward portion of the tank body 1 is a front body support 2. The tank trailer also includes a turnable front axle 3 which has rotatably mounted on the opposite ends thereof front wheels 4. Disposed between the body support member 2 and the front axle 3 and secured to the same is the shock assembly of the invention employed in this embodiment as a fifth wheel assembly, the fifth wheel assembly being referred to in general by the reference numeral 5.

Referring now to Fig. 3 in particular, it will be seen that the fifth wheel assembly 5 includes an elongated channel shaped frame or mounting member 6 which includes a raised central portion 7. Secured to the center of the central portion 7 and extending upwardly therefrom is a cylinder 8. The cylinder 8 has disposed therein lubricating fluid 9 and has received therein in the upper part thereof a second cylinder which may be described as a piston 10. The upper end of the piston 10 is secured to a suitable mounting member or plate 11.

The piston 10 is hollow and forms a lubricating fluid supply with the remainder of the lubricating fluid 9 being disposed therein. The interior of the piston 10 communicates with the interior of the cylinder 8 by a fluid passage 12 through the bottom wall 13 of the piston 10. The piston 10 is of a smaller diameter than the cylinder 8 and is intended to both rotate within the cylinder 8 and to move vertically with respect thereto. In order to stabilize the piston 10 relative to the cylinder 8, there is provided a sleeve-like stabilizing bearing 14. Bearing 14 is of a length to extend between the working surfaces of the cylinder 8 and piston 10, and in any event would be substantially longer than one-half of the length of either piston 10 or cylinder 8. The stabilizing bearing 14 is secured to the outer surface of the piston 10 and slides freely relative to the inner surface of the cylinder 8. In addition, bearing 14 permits lateral relative movement between the piston and cylinder so that road shocks due to uneven road surfaces can be absorbed and yet allow a predetermined amount of free vertical travel of the piston within the cylinder. Bearing 14 may also be secured to cylinder 8 and be free of the piston 10.

Carried by the bottom wall 13 of the piston 10 and extending upwardly therein is a sleeve 15. The sleeve 15 has received therein an upper portion of a relatively large fastener, such as the bolt 16. The bolt 16 passes upwardly through the central portion 7 of the mounting member 11 and through a relatively large opening 17 in the bottom wall 13 of the piston 10.

Carried by the fastener 16 within the sleeve 15 is resilient buffer means in the form of a plurality of resilient rings 18, the rings 18 being preferably formed of neoprene O-rings. Overlying the rings 18 and compressively engaging the same is an enlarged washer 19 which is retained in place on the upper part of the fastener 16 by a nut 20 threaded onto the fastener 16. The rings 18 resiliently cushion upward shock movement of the piston 10 with respect to the cylinder 8.

Surrounding the cylinder 8 in spaced relation thereto is another cylinder or sleeve 21. The sleeve 21 has disposed in a majority of the space between it and the cylinder 8 resilient shock means in the form of resilient rings 22. The rings 22 are also preferably formed of neoprene and are in the form of O-rings. Overlying the rings 22 and resting thereupon is a bearing plate 23. The bearing plate 23 has slidably engaged therewith for rotation about the axis of the fastener 16, a pressure member 24. The pressure member 24 is carried by an annular support 25 and together with which forms an annular compression member whose upper end is suitably secured to the underside of the mounting plate 11.

The resilient shock means 22 absorbs shock caused by sudden downward shock movement of the piston 10 and the mounting plate 11 with respect to the cylinder 8 and the mounting member 6. In order that the lubricating fluid may be prevented from escaping and dust and other foreign matter may be prevented from entering into the sleeve 21, there is provided an accordion-type shield 26. The upper edge of the shield 26 is suitably secured to a depending ring 27 which is secured to the underside of the mounting plate 11. The lower edge of the shield 26 is secured to an L-shaped cross-sectional ring 28 which is interlocked with an outwardly projecting ring 29 carried by the upper edge of the sleeve 21. The shield 26 is turnable with respect to the sleeve 21.

In order that access to the nut 20 may be obtained, there is provided an opening 30 in the mounting plate 11. The opening 30 is aligned with the nut 20 and permits both adjustment of the nut 20 and removal thereof whereby the two parts of the fifth wheel assembly 5 may be separated for repairs or other purposes.

Referring now to Figure 7 in particular, the support member 2 carried by the trailer body 1 is relatively hollow and includes a bottom wall 31. The mounting plate 11 is secured in abutting engagement with the bottom wall 31 by a plurality of removable fasteners 32. Thus the fifth wheel assembly may be quickly and easily removably attached to the trailer body 1 through its connection to the support member 2.

The outer parts of the mounting member 6 are provided with apertures 33. The apertures 33 are arranged in pairs and receive therethrough suitable U-bolts 34, as is best illustrated in Fig. 2. The U-bolts 34 pass around the axle 3 and have secured to the lower ends thereof plates 35 which facilitate the clamping of the support member 6 to the axle 3.

In order that the trailer may be easily towed, there is provided at opposite ends of the forward part of the frame member 6 transversely spaced pairs of pillow blocks 36. The pillow blocks 36 have removably received therein ends of a draft member 37 in such a manner that the draft member 37 may be pivoted vertically about a horizontal axis, such as is best illustrated in Figure 1.

From the foregoing description of the fifth wheel construction, it is readily apparent that the fifth wheel assembly 5 will permit the freedom of rotation of the front axle 3 with respect to the trailer body 1 so that the trailer may be easily steered. At the same time, the structure of the fifth wheel assembly 5 is such that it is extremely strong so as to resist any forces which might be imposed thereon. Further, the fifth wheel assembly 5 is in fact a shock assembly which will absorb the shocks which would otherwise be transmitted from the front axle 3 to the body 1 and vice versa.

In the operation of the invention, all vertical shocks are absorbed by the rings 18 and 22 and lateral shock is absorbed by the stabilizing bearing 14 in addition to the rings 18 and 22 with the bearing 14 also operating as a bearing between the cylinder and piston during turning of the assembly. The vertical reciprocation of the piston 10 results in the pumping of the lubricating fluid 9 through the internally disposed parts of the fifth wheel assembly to assure proper lubrication.

Figs. 8, 9 and 10 illustrate the shock assembly employed as a suspension means to support a dual or tandem axle assembly from the rear of a truck or other vehicle. In this embodiment a shock assembly is employed on each side of the axles. The drawing illustrates in elevation one of such shock assemblies. Although the shock assembly when employed in this manner would correspond internally to the structure shown in Fig. 3 of the drawings, it of course would not be turnable as in the case of the shock assembly illustrated in Fig. 3.

Referring to Fig. 8 there is shown tandem or dual axles 38 located at the rear of a vehicle and upon which are mounted wheels 39, shown in dash lines. Axles 38 are horizontally spaced by an equalizing beam 40 which is pivoted at each end by pins 41 to brackets 42 in turn secured to the respective axle housing 43 and depending therefrom.

In order to suspend the tandem axles from the side frame 44 of the vehicle, the shock assembly 45 of the invention is employed. The shock assembly in this adaptation corresponds internally to the shock assembly illustrated in Fig. 3 and therefor need not again be described.

Shock assembly 45 has a lower mounting member or plate 46 from which depends the bracket 47. Bracket 47 overlies the beam 40 generally centrally of axles 38 and is rigidly welded to or secured to beam 40 such as by the bolt 48 which extends through the ears of the bracket and beam 40. Bearing 14 absorbs the difference in vertical movement between the axles due to uneven road surfaces.

In addition shock assembly 45 has an upper mounting member or plate 49 which is secured to or provided as a part of the piston 50 of shock assembly 45. Piston 50 corresponds to the piston 10 in Fig. 3. Mounting plate 49 may be bolted or otherwise secured to frame 44 of the vehicle. As shown in Fig. 8 a plate 51 rests on top of the frame 44 and bolts 52 extend through plate 51 and upper mounting plate 49 to securely attach the shock assembly to frame 44.

In order to prevent the tendency of the axle housings 43 to rotate under brake or power application a torque link 53 is secured by bolt 54 to bracket 55 provided on the top of the banjo section of the rear axle housing 43. Link 53 extends forwardly of the rear axle housing 43 and is secured by bolt 56 to a bracket 57 which is secured to the cross frame member 58.

Similarly a torque link 59 is secured by bolt 60 to bracket 61 provided on the top of the banjo section of the front dual axle housing 43. Link 59 extends rearwardly of the front axle housing 43 and is secured by bolt 62 to a bracket 63 which is attached to the cross frame member 58.

To prevent any tendency for fore and aft movement of the tandem unit a drag link 64 is secured to bracket 42 on the forward tandem axle and extends forwardly therefrom. Drag link 64 is secured to a depending bracket 65 which is bolted or otherwise attached to side frame 44 of the vehicle.

Other means of securing the tandem unit described to the frame may be employed in conjunction with shock assembly 45, and the above description is also applicable to the shock assembly unit 45 and attachment means at the opposite side of the vehicle. Fig. 10 illustrates a rear view of the employment of the shock assembly 45 on each side of the rear of a vehicle wherein dual axles are employed. The shock assembly 45 distributes the load equally over the tandem unit and the piston and cylinder as in Fig. 3 move relative to each other against the resilient shock absorbing means therein as described with respect to Fig. 3 to provide a suspension system for a dual axle system which maintains the wheels in parallel over uneven road surfaces and permits freedom of movement of the wheels in a vertical and lateral direction if required by rough road surfaces.

Another embodiment of the invention is illustrated by Figs. 11–14, wherein the shock assembly is shown as employed as a suspension for a single rear axle. Fig. 11 illustrates the shock assembly applied to one side of the vehicle. A similar shock assembly as shown in Fig. 14 would be employed on the opposite side of the vehicle to support the single rear axle assembly to be described. Since the shock assembly on each side of the vehicle is the same it is only necessary to describe one such assembly and it application to the vehicle.

Referring now to Figs. 11–14 of the drawings there is shown a shock assembly comprising an elongated mounting member 66 which may be bolted to the side frame 67 of the vehicle fore and aft of the single I-beam axle 68. A lower mounting member 69 carries depending brackets 70 for bolting the shock assembly to the axle 68.

In this embodiment of the invention the parts of the shock assembly are reversed from the parts shown in the first two embodiments.

The internal construction of the shock assembly for the single axle application comprises an upper cylinder 71 which is closed at its head and may be welded or otherwise secured to the upper mounting member 66. A second cylinder or piston 72 is welded at its lower end to the lower mounting member 69 and is received in the upper cylinder 71 and is laterally displaced from the upper cylinder 71. An elongated stabilizing bearing 73 is disposed between the upper and lower cylinder and may be bonded or otherwise secured to either cylinder. In the drawing illustrating the invention the bearing 73 is bonded to the inner or lower cylinder 72 and the outer or upper cylinder 71 is tapered at its lower end as at 74 to improve the vertical sliding movement between the parts in service. Bearing 73 is of neoprene or the like and while it permits vertical sliding movement between the parts as the two cylinders move relative to each other it also may be laterally displaced as shown in Fig. 13 to absorb shock caused by uneven road conditions.

If the bearing 14 in Fig. 3 illustrating the fifth wheel use of the shock assembly is laterally displaced such displacement is much more pronounced than when the shock assembly is used as a rear axle suspension unit. This is due to the two point support of the rear axle whether it be single or dual axles. In the fifth wheel use there is only single point support of the axle and less resistance to maintaining the axle parallel to the body of the vehicle. Fig. 13 therefore shows an exaggerated displacement of the bearing 73 and also serves to illustrate the displacement of the bearing were it employed in the fifth wheel use of the shock assembly shown in Fig. 3.

The bearing 73 should be of a length to cover the entire working overlapping surfaces of the cylinders 71 and 72, and in any event is substantially longer than one-half the length of each cylinder.

A cylindrical sleeve 75 is secured to the head of outer cylinder 71 and is outwardly spaced from the body of the cylinder.

An annular compression member 76 is welded to the lower mounting plate 69 in outwardly spaced relation to inner cylinder 72 and projects upwardly in line with the vertical space between outer cylinder 71 and sleeve 75. A flat circular compression plate 77 is welded to or provided as a part of the upper ends of compression member 76 and operates within the vertical space between outer cylinder 71 and sleeve 75. A brass plate 78 is carried by compression plate 77.

A plurality of O-rings 79 of neoprene or the like are disposed on top of one another within the annular space between outer cylinder 71 and sleeve 75 and are confined between the brass plate 78 carried by compression member 76 and the head of outer cylinder 71. When due to road conditions the axle moves upwardly and the vehicle frame downwardly O-rings 79 are compressed as illustrated in Fig. 13 and the shock of the upward axle movement and downward frame movement is absorbed by the O-rings 79.

Referring now to the central structure of the shock assembly there is shown an elongated fastening means or bolt 80 which secures the inner cylinder or piston 72 to the outer cylinder 71 while permitting relative movement between the cylinder.

The head 81 of bolt 80 rests upon the head of outer cylinder 71 within the cap 82 and the bolt passes down centrally of the inner cylinder to receive a nut 83. Nut 83 when threaded home engages a flat plate 84 loosely disposed within the inner cylinder 72. The latter plate has a central opening through which bolt 80 freely passes.

A second flat plate 85 is spaced upwardly within inner cylinder 72 and is welded to the wall of the inner cylinder 72. A central opening in plate 85 permits free passage of the bolt 80 through the plate.

A plurality of O-rings 86 of neoprene or the like, are disposed one above the other between the respective plates 84 and 85. O-rings 86 are shown as more of a pillowlike shape than O-rings 79. After receipt of road shock in service by O-rings 79 and upon the tendency of the frame or vehicle to move to its initial position with respect to the axle 68, the rebound shock is absorbed by the inner O-rings 86. Fig. 13 illustrates shock being absorbed by outer O-rings 79 and Fig. 12 shows the rebound shock being absorbed by inner O-rings 86.

The inner cylinder 72 is closed at the bottom by the closure member 87 which may be comprised of a pair of steel plates within which is compressed a pad 88 of neoprene or the like into engagement with the wall of the inner cylinder. Closure member 87 is easily removable to provide for adjustment of nut 83 on the lower end of bolt 80.

The length of the outer and inner cylinders is such as to permit relative movement therebetween and absorption of shock by the O-rings 79 and 86 without engagement by the ends of one cylinder with the outer plates disposed opposite the end of each cylinder. Likewise the bolt 80 has freedom of vertical downward movement without engagement with closure member 87.

To assist in the clamping of the unit and lubrication of the parts lubricating fluid 90 is disposed inside the unit to the level shown by the dash lines in the drawings. Fluid 90 may pass throughout the parts by means of the passages 91 in the compression member 76 and the inner cylinder 72 respectively. Passages 91 may be increased or decreased in diameter to control the dampening effect of fluid 90.

To insure that the inside of the unit is dust free and retains fluid 90 therein, a flexible seal 92 of neoprene or the like is secured by clamps 93 or the like, at the upper end of the seal to the sleeve 75 and at the lower end to the compression member 76. The flexibility of the seal permits expansion and contraction of the same as the cylinders move vertically relatively to each other in service.

In order to prevent fore and aft movement of the axle a drag link 94 is suitably secured to lower mounting member 69 and extends forwardly therefrom. The forward end of link 94 is secured to a depending bracket 95 which is bolted or otherwise secured to the upper mounting member 66.

In order to increase the resiliency of the shock assembly of the invention air may be added to the unit and in such case the unit would be sealed against loss of air. This would require, for example, a heavier flexible seal 92 to withstand the desired air pressure and an impervious juncture between the seal and the assembly and a similar impervious seal of the closure member 87 to cylinder 72.

In some applications of the invention either as a fifth wheel or suspension unit for use in the front or rear of a truck, the lower mounting member may in fact be provided as the axle of the vehicle instead of being mounted on the axle or axle housing. The mounting member would in such event receive the wheel spindles.

It also may be advisable to locate the resilient shock means for absorbing rebound between the members outside the cylinders rather than inside. Likewise the stabilizing bearing may be disposed between the sleeve and outer cylinder.

The shock assembly of the invention provides a generally lightweight and low cost unit which may be employed as a fifth wheel in conjunction with a turnable front wheel axle or as a suspension unit for tandem or dual axles employed on the front or rear of a vehicle. A mere reversal of the parts of the unit permit it to be readily assembled with a single rear axle for suspension of the single rear axle in ordinary road service. It has been found that the shock assembly of the invention is approximately four-hundred pounds lighter than corresponding fifth wheels or shock assemblies. This amounts to a tremendous savings in long distance hauls.

Various modes of carrying out the invention are contemplated as being within the scope of the following claims particularly pointing out and distinctly claiming the subject matter which is regarded as the invention.

I claim:

1. In a shock assembly for vehicles, an upper mounting member and a lower mounting member, a first cylinder extending from one of said members and a second cylinder extending from the other of said members with said second cylinder being received within the first cylinder, means retaining said second cylinder in said first cylinder and limiting relative axial movement of said cylinders in a direction tending to separate the cylinders, a stack of resilient O-rings disposed between said mounting members and cushioning shock movement of one of said mounting members relative to the other mounting member in a direction telescoping said cylinders with said O-rings being free to deform under compression within predetermined limits, and a stabilizing bearing of flexible material disposed between the overlapping working surfaces of said cylinders to absorb shock created by relative lateral movement of said cylinders, said bearing being bonded to one of said cylinders and free of the other cylinder.

2. In a shock assembly for vehicles comprising a frame member securable to a turnable front trailer axle, a first cylinder carried by said frame member, a mounting member adapted to be secured to the vehicle body, a second cylinder depending from said mounting plate, said second cylinder being received in said first cylinder, a fastener retaining said second cylinder in said first cylinder and limiting vertical movement of said second cylinder, resilient shock means disposed between said frame member and said mounting plate and cushioning downward shock of said mounting plate, said resilient shock means being mounted within a third cylinder surrounding said first cylinder, and an elongated stabilizing bearing of flexible material disposed between the first cylinder and the second cylinder, said bearing being bonded to said second cylinder and being of a length substantially greater than one-half the length of said second cylinder to absorb shock induced by relative lateral movement of said second cylinder and first cylinder.

3. In a shock assembly for vehicles, an upper mounting member and a lower mounting member, a first cylinder secured to one of said members and extending therefrom and a second cylinder secured to the other of said members and extending therefrom with one of said cylinders being received within the other of said cylinders to dispose one of the cylinders as an inner cylinder and the other of said cylinders as an outer cylinder, fastening means retaining the inner cylinder in the outer cylinder and limiting relative axial movement of said cylinders in a direction tending to separate the cylinders, a stack of separate resilient O-rings assembled between the members to absorb shock movement between the mounting members in a direction telescoping said cylinders with said O-rings being free to deform under compression within predetermined limits, a second stack of separate resilient O-rings assembled around said fastening means and adapted to cushion rebound shock movement of the shock assembly in a direction tending to separate said cylinders, said second stack of O-rings being free to deform under compression within predetermined limits, and an elongated stabilizing bearing of flexible material disposed between the overlapping working surfaces of said cylinders, said bearing being bonded to one of said cylinders and free of the other cylinder to absorb shock induced by relative lateral and rotational movement of said cylinders.

4. In a shock assembly for vehicles, an upper mounting member and a lower mounting member, a first cylinder secured to one of said members and extending therefrom and a second cylinder secured to the other of said members and extending therefrom with one of said cylinders being received within the other of said cylinders to dispose one of the cylinders as an inner cylinder and the other of said cylinders as an outer cylinder, fastening means retaining the inner cylinder in the outer cylinder and limiting relative axial movement of said cylinders in a direction tending to separate the cylinders, a stack of separate resilient non-metallic rings assembled between the mounting members to absorb shock movement between the mounting members in a direction telescoping said cylinders with said resilient rings being free to deform under compression within predetermined limits, a second stack of resilient non-metallic rings assembled around said fastening means and adapted to cushion rebound shock movement of the shock assembly in a direction tending to separate said cylinders, said second stack of rings being free to deform under compression within predetermined limits, and an annular stabilizing bearing of flexible material disposed between the overlapping working surfaces of said cylinders.

References Cited in the file of this patent

UNITED STATES PATENTS

| | | |
|---|---|---|
| 1,098,598 | Todd | June 2, 1914 |
| 2,123,388 | Viguerie | July 12, 1938 |
| 2,356,962 | Williams | Aug. 29, 1944 |
| 2,708,112 | Seddon et al. | May 10, 1955 |

FOREIGN PATENTS

| | | |
|---|---|---|
| 543,769 | France | June 9, 1922 |
| 561,659 | Great Britain | May 30, 1944 |